United States Patent
Alur Shivaswamy et al.

(10) Patent No.: US 12,543,237 B2
(45) Date of Patent: Feb. 3, 2026

(54) HANDLING CORE NETWORK CONNECTION FAILURE

(71) Applicant: Rakuten Symphony, Inc., Tokyo (JP)

(72) Inventors: Praveen Kumar Alur Shivaswamy, Bangalore (IN); Sridhar Bhaskaran, Bangalore (IN); Rohan Harihara Iyer, Bangalore (IN); Girish Manjunath, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 311 days.

(21) Appl. No.: 18/015,585

(22) PCT Filed: Nov. 23, 2022

(86) PCT No.: PCT/US2022/080414
§ 371 (c)(1),
(2) Date: Jan. 11, 2023

(87) PCT Pub. No.: WO2024/112353
PCT Pub. Date: May 30, 2024

(65) Prior Publication Data
US 2024/0224365 A1    Jul. 4, 2024

(51) Int. Cl.
| | | |
|---|---|---|
| H04W 76/20 | (2018.01) | |
| H04W 24/02 | (2009.01) | |
| H04W 48/14 | (2009.01) | |
| H04W 84/04 | (2009.01) | |
| H04W 92/24 | (2009.01) | |

(52) U.S. Cl.
CPC .......... *H04W 76/20* (2018.02); *H04W 24/02* (2013.01); *H04W 48/14* (2013.01); *H04W 84/042* (2013.01); *H04W 92/24* (2013.01)

(58) Field of Classification Search
CPC ..... H04W 76/20; H04W 24/02; H04W 48/14; H04W 84/042; H04W 92/24
See application file for complete search history.

(56) References Cited

U.S. PATENT DOCUMENTS

2019/0089579 A1 * 3/2019 Sang .................. H04W 36/305
2019/0215756 A1   7/2019 Park et al.
(Continued)

FOREIGN PATENT DOCUMENTS

| CN | 114143839 A | 3/2022 |
|---|---|---|
| WO | 2021148257 A1 | 7/2021 |

(Continued)

OTHER PUBLICATIONS

International Search Report and Written Opinion for International Patent Application No. PCT/US22/80414 mailed Mar. 6, 2023.
(Continued)

*Primary Examiner* — Ajay Cattungal
(74) *Attorney, Agent, or Firm* — Sughrue Mion, PLLC

(57) ABSTRACT

In general, the current subject matter relates to handling core network connection failure. In some implementations, with a connection down between a gNodeB and a 5G core network, the gNodeB can be caused to be in an active state such that the gNodeB can provide support to Non-Standalone (NSA) user equipments (UEs) with the connection down between the gNodeB and the 5G core network.

24 Claims, 15 Drawing Sheets

(56) References Cited

U.S. PATENT DOCUMENTS

| | | | |
|---|---|---|---|
| 2020/0092784 A1* | 3/2020 | Hampel | ............... H04W 40/22 |
| 2021/0058826 A1* | 2/2021 | Mao | ................ H04W 28/0933 |
| 2022/0038164 A1 | 2/2022 | Wei et al. | |
| 2022/0191875 A1* | 6/2022 | Panteleev | ......... H04W 72/0453 |
| 2023/0247672 A1* | 8/2023 | Pantelidou | ............ H04W 24/10 370/329 |
| 2025/0119909 A1* | 4/2025 | Xiong | ................. H04W 76/38 |

FOREIGN PATENT DOCUMENTS

| | | |
|---|---|---|
| WO | 2021222942 A1 | 11/2021 |
| WO | 2021242247 A1 | 12/2021 |

OTHER PUBLICATIONS

3GPP TS 38.401, 3rd Generation Partnership Project, Technical Specification Group Radio Access Network, NG-RAN, Architecture description (Release 17), Jul. 2022.

3GPP TS 38.473, 3rd Generation Partnership Project, Technical Specification Group Radio Access Network, NG-RAN,F1 Application Protocol (F1AP) (Release 17), Sep. 2022.

Extended European search report dated Dec. 5, 2025, in European Application No. 22966647.4, 10 pages.

Nokia et al., "Discussion on NSA-SA Cell Operation," dated Oct. 23, 2020, R3-206645, XP052399964,3GPP TSG-RAN WG3 Meeting #110-e, E-Meeting, Source: Nokia, Nokia Shaghai Bell, 2 pages.

\* cited by examiner

HANDLING CORE NETWORK CONNECTION FAILURE

CROSS-REFERENCE TO RELATED APPLICATIONS

The present application claims priority to and is the 35 U.S.C. 371 United States National Phase application based on International Patent Application No. PCT/US22/80414, filed on Nov. 23, 2022, entitled "HANDLING CORE NETWORK CONNECTION FAILURE," which is hereby incorporated by reference in its entirety.

TECHNICAL FIELD

In some implementations, the current subject matter relates to telecommunications systems, and in particular, to handling core network connection failure.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5GNR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

In a 5G wireless communication system, in order for a base station to properly support communications, an F1 interface is set up between a distributed unit (DU) of a base station and a centralized unit (CU) of the base station. The F1 interface is set up in accordance with 3GPP standards, including 3GPP TS 38.401 "NG-RAN; Architecture description" and 3GPP TS 38.473 "NG-RAN; F1 application protocol (F1AP)." However, in accordance with 3GPP standards, if the base station, e.g., the CU thereof, does not have connectivity with the 5G core network (5GC), the base station cannot provide service to any mobile telephones and other user equipments (UEs), that are trying to latch on to Standalone (SA) 5G network. UEs that are Non-Standalone (NSA) devices are 5G-enabled but are supported by 4G infrastructure and are therefore not reliant on the base station having connectivity with the 5GC for communications to be possible on the 5G wireless communication system.

SUMMARY

In some implementations, the current subject matter relates to a computer-implemented method. The method may include, with a connection down between a gNodeB and a 5G core network, causing the gNodeB to be in an active state such that the gNodeB can provide support to Non-Standalone (NSA) user equipments (UEs) with the connection down between the gNodeB and the 5G core network.

The method may allow the F1 interface to be set up despite core network connection failure. The DU may therefore be available to provide service to at least some UEs despite core network connectivity failure, which may relieve burden on one or more other DUs of the base station and/or on one or more DUs of another base station that would otherwise have to serve those UEs.

In some implementations, the current subject matter can include one or more of the following optional features.

In some implementations, causing the gNodeB to be in the active state can include the active state being set in a distributed unit (DU) of the gNodeB in response to information received by the DU from a centralized unit (CU) of the gNodeB.

In some implementations, causing the gNodeB to be in the active state can include causing an F1 interface to be set up between a CU of the gNodeB and a DU of the gNodeB. Further, the F1 interface can be set up between the CU of the gNodeB and the DU of the gNodeB without performing System Information Block Type 1 (SIB1) scheduling or the F1 interface can be set up between the CU of the gNodeB and the DU of the gNodeB performing SIB1 without 5G System (5GS) Tracking Area Code (TAC).

In some implementations, causing the gNodeB to be in the active state can include transmitting a GNB-CU CONFIGURATION UPDATE message from a CU of the gNodeB to a DU of the gNodeB. Further, a Cells to be Activated List included in the GNB-CU CONFIGURATION UPDATE message can indicate to the DU that the gNodeB can provide support to NSA UEs, and either inclusion of a Cells to be Barred List in or exclusion of an Available PLMN List from the GNB-CU CONFIGURATION UPDATE message can indicate to the DU that the gNodeB cannot provide support to Standalone (SA) UEs.

In some implementations, the operations can further include, after causing the gNodeB to be in the active state with the connection down between the gNodeB and the 5G core network, causing, in response to the connection between the gNodeB and the 5G core network becoming available, the gNodeB to be able to provide support to SA UEs. Further, causing the gNodeB to be in the active state such that the gNodeB can provide support to NSA UEs can include transmitting a first GNB-CU CONFIGURATION UPDATE message from a CU of the gNodeB to a DU of the gNodeB, and causing the gNodeB to be able to provide support to SA UEs can include transmitting a second GNB-CU CONFIGURATION UPDATE message from the CU of the gNodeB to the DU of the gNodeB; and/or the gNodeB can be caused to be in the active state with the connection down between the gNodeB and the 5G core network without performing SIB1 scheduling or the gNodeB can be caused to be in the active state with the connection down between the gNodeB and the 5G core network performing SIB1 scheduling without the 5GS TAC, and causing the gNodeB to be in the active state such that the gNodeB is able to provide support to SA UEs can include performing SIB1 scheduling. Further, a first Cells to be Activated List included in the first GNB-CU CONFIGURATION UPDATE message can indicate to the DU that the gNodeB can provide support to NSA UEs, a first Cells to be Barred List included in or an Available PLMN List excluded from the first GNB-CU CONFIGURATION UPDATE message can indicate to the DU that the gNodeB cannot provide support to SA UEs, and a second Cells to be Activated List included in and/or the Available PLMN List included in the second GNB-CU CONFIGURATION UPDATE message can indicate to the DU that the gNodeB can provide support to the SA UEs.

In some implementations, the gNodeB can include the at least one processor and the at least one non-transitory storage media.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

Figure 1A:
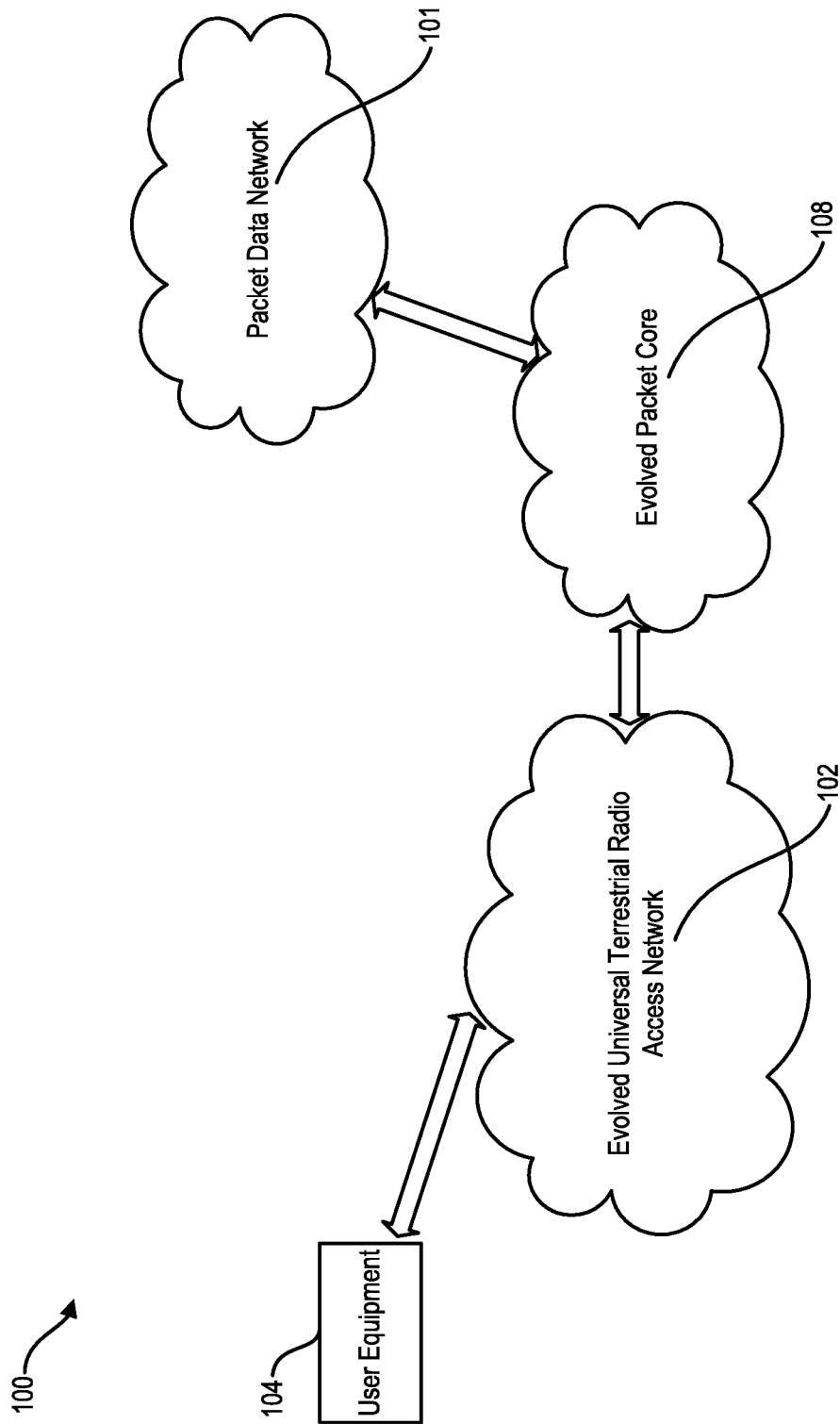
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to handling core network connection failure.

In some implementations, an F1 interface can be set up between a centralized unit (CU) of a base station (e.g., a gNodeB) of a 5G wireless communication system and a distributed unit (DU) of the base station even if the base station does not have connectivity to a core network of the 5G wireless communication system. Currently, under 3GPP standards, a UE cannot set up a connection with a standalone 5G wireless communication system if the base station does not have connectivity to the 5G core network. The DU therefore cannot provide service to Standalone (SA) user equipments (UEs), that are reliant on the base station being connected to the 5G core network for the UE to communicate over the wireless communication system. The DU is thus underutilized at least with respect to those UEs.

The F1 interface being set up despite core network connection failure can allow the DU to be moved to an active state that allows the DU to provide service to a subset of UEs that are not reliant on the base station being connected to the 5G core network for the UEs to communicate over the wireless communication system, e.g., Non-Standalone (NSA) devices as a subset of UEs. The DU of the base station may therefore be available to provide service to at least some UEs desiring to communicate over the 5G wireless communication system despite core network connectivity failure, which may relieve burden on one or more other DUs of the base station and/or on one or more DUs of another base station that would otherwise have to serve those UEs. Should connectivity be restored (or established in an initial instance) between the base station and the 5G core network, the DU can provide service to a remainder of UEs, namely UEs, e.g., SA devices, that are reliant on the base station being connected to the 5G core network for the UE to communicate over the 5G wireless communication system. The DU can therefore be configured to provide service for as many UEs as possible at a time the F1 interface is set up with the service provided by the DU later expanding for additional UEs when 5G core network connectivity is restored (or established).

Should the base station have connectivity with the 5G core network at a time of F1 startup, the F1 interface can be set up in accordance with 3GPP standards so the DU can provide service to NSA UEs and SA UEs. The F1 interface can thus be set up without regard to whether or not the UEs are reliant on the base station being connected to the 5G core network for the UE to communicate over the wireless communication system. The DU can therefore be configured to provide service for as many UEs as possible at a time the F1 interface is set up.

In some implementations, the subset of UEs to which the DU can provide service despite a lack of base station-core network connectivity can include Non-Standalone (NSA) devices that are 5G enabled. Further, the base station can include a 5G base station (e.g., a gNodeB), and the core network can include a 5G core network (5GC). NSA devices that are 5G-enabled are configured to be supported by 4G infrastructure and are therefore not reliant on the base station having connectivity with the 5GC for communications to be possible on the 5G wireless communication system. Thus, the F1 interface being set up between the base station's CU and DU with the base station not currently having connectively with the 5GC can allow NSA devices to communicate with the DU for communication over the 5G wireless communication system. Should connectivity be restored (or established in an initial instance) between the base station and the 5G core network, the DU can provide service to a remainder of UEs, namely Standalone (SA) devices that are reliant on the base station being connected to the 5G core network for the UE to communicate over the 5G wireless communication system.

3GPP standards defining one or more aspects related to the current subject matter include 3GPP TS 38.401 "NG-RAN; Architecture description" and 3GPP TS 38.473 "NG-RAN; F1 application protocol (F1AP)." Standards of the O-RAN Alliance may also be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
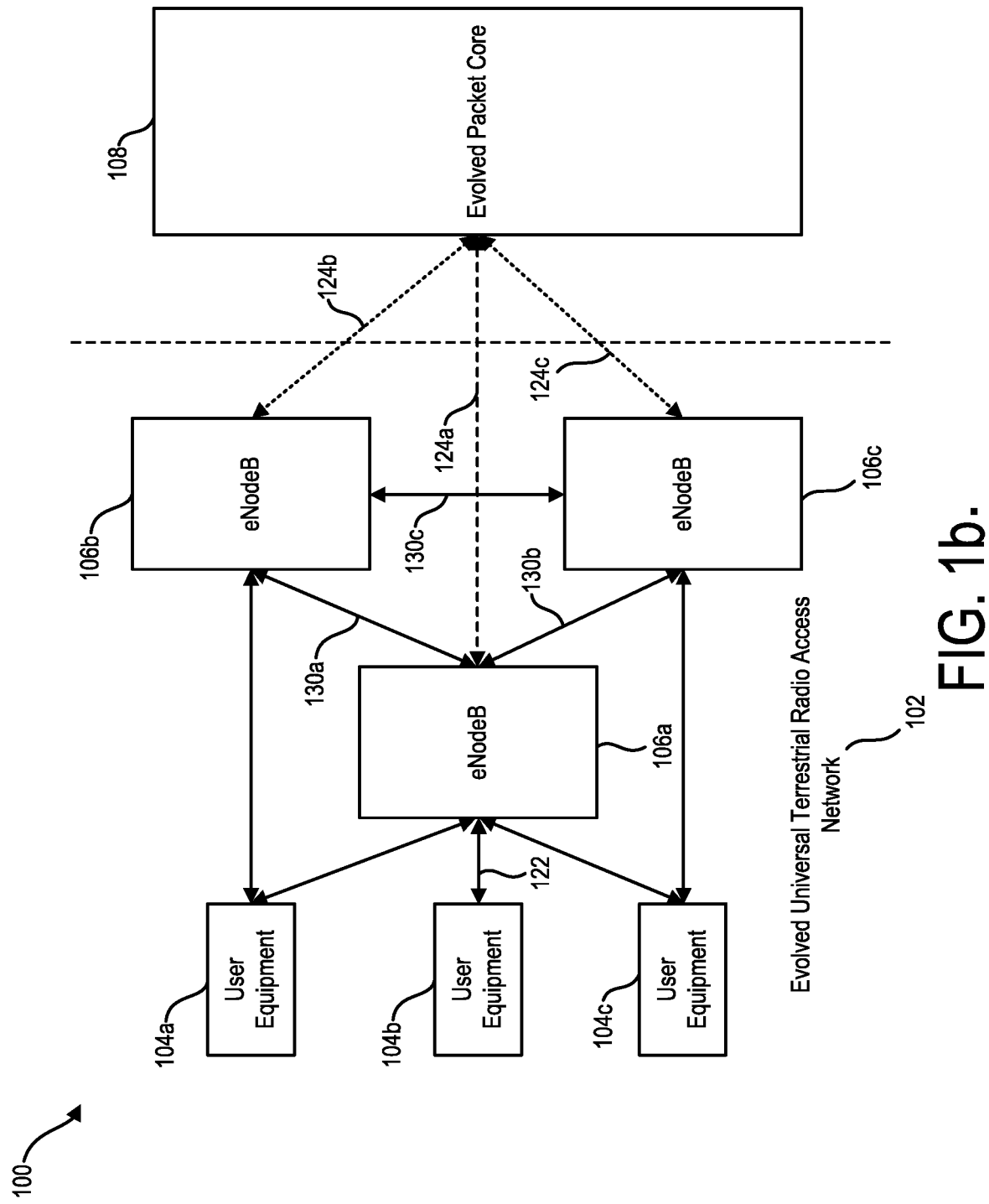

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
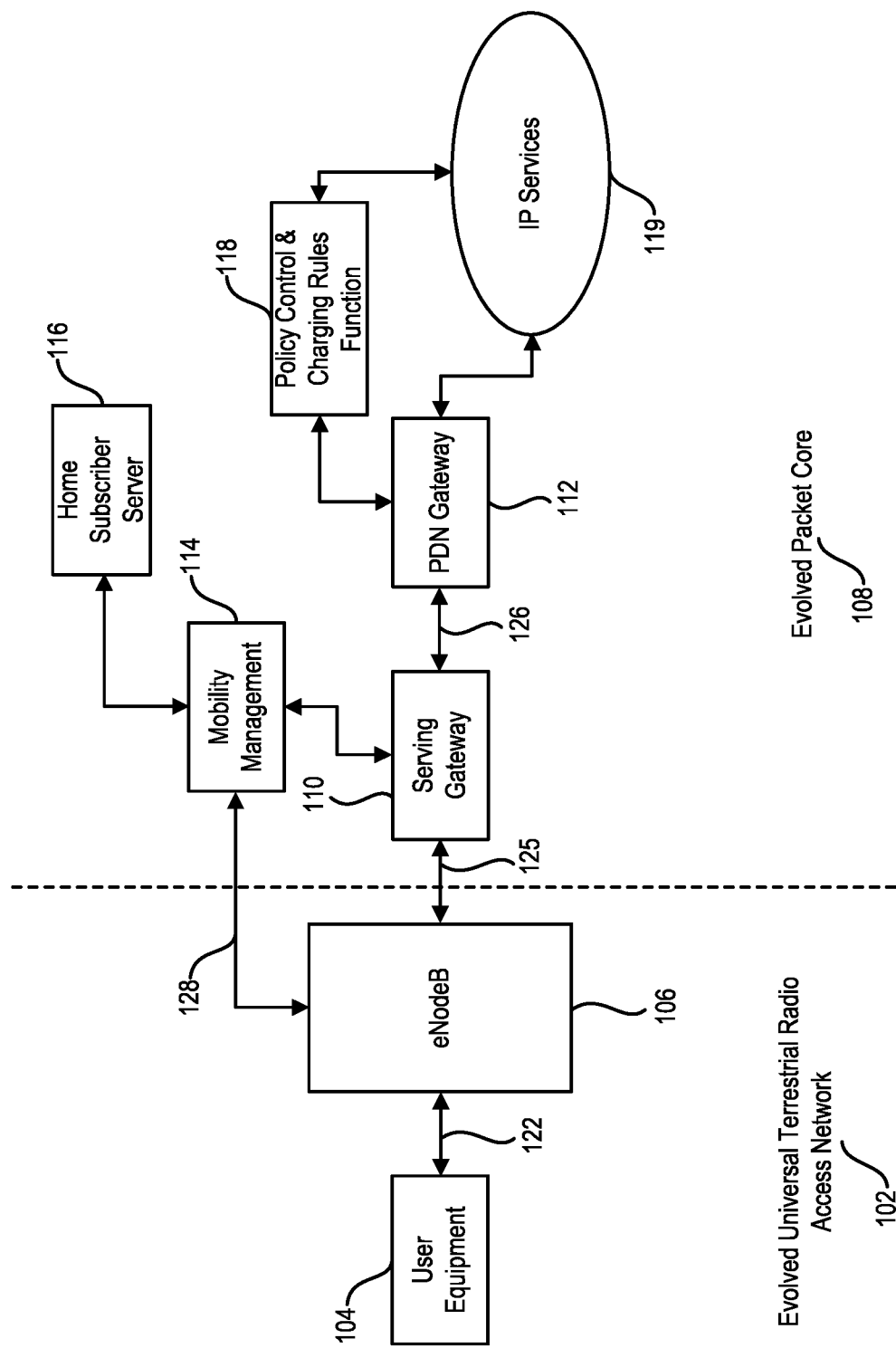

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
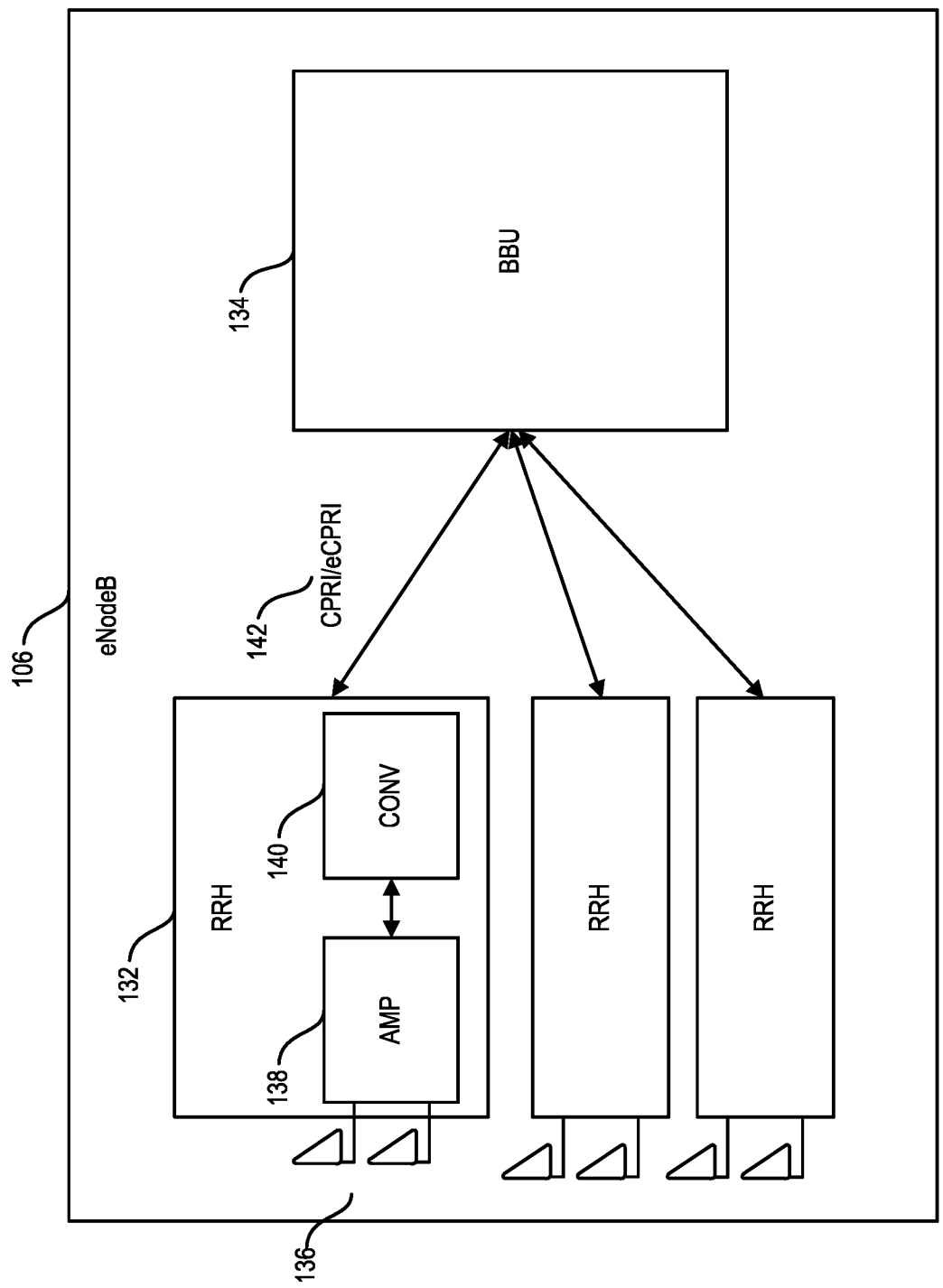

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single and multi user MIMO), number of sectors (6 maximum), maximum transmission rate (downlink: 150

Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
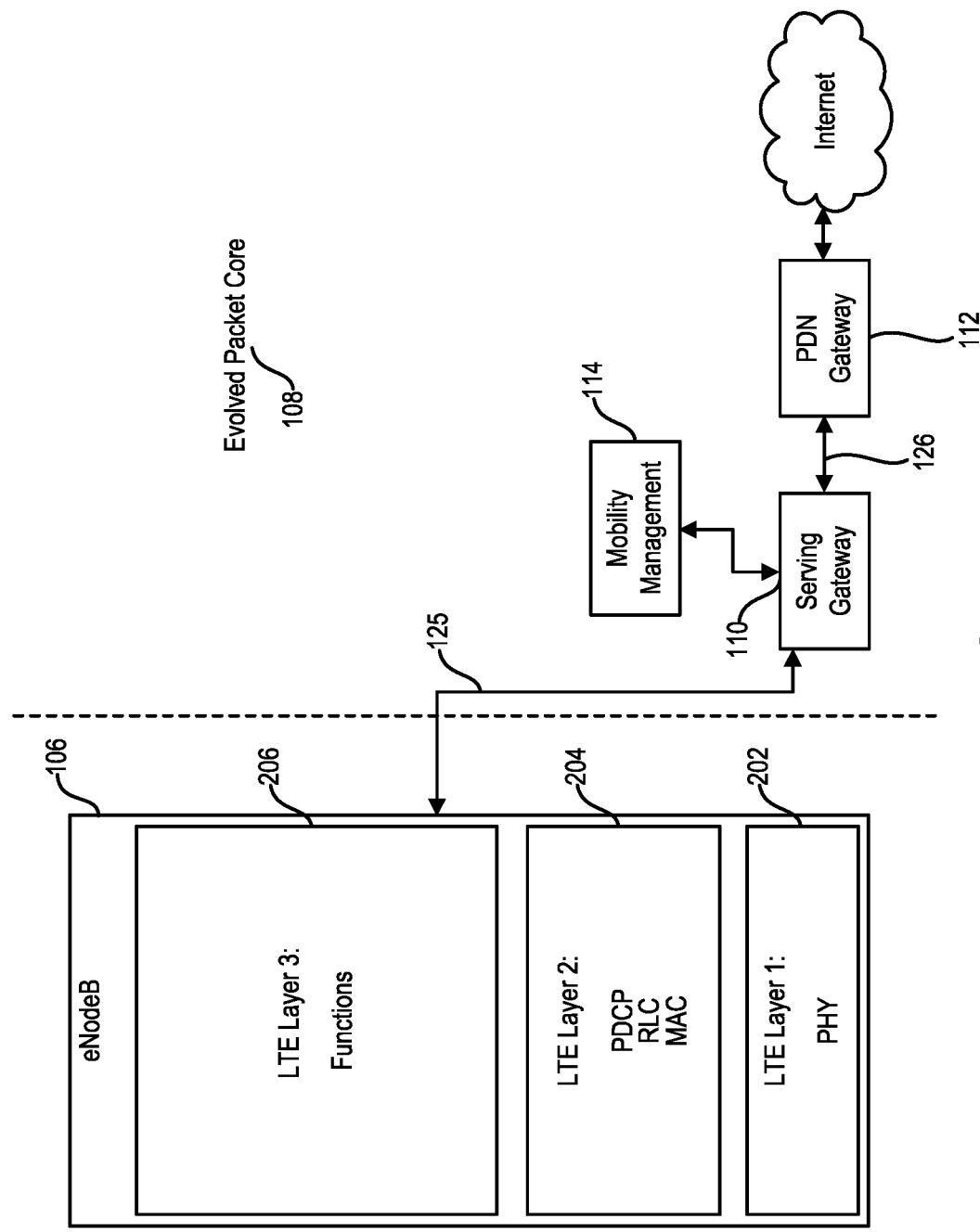
FIG. 2 illustrates further detail of an evolved Node B shown in FIGS. Ta-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
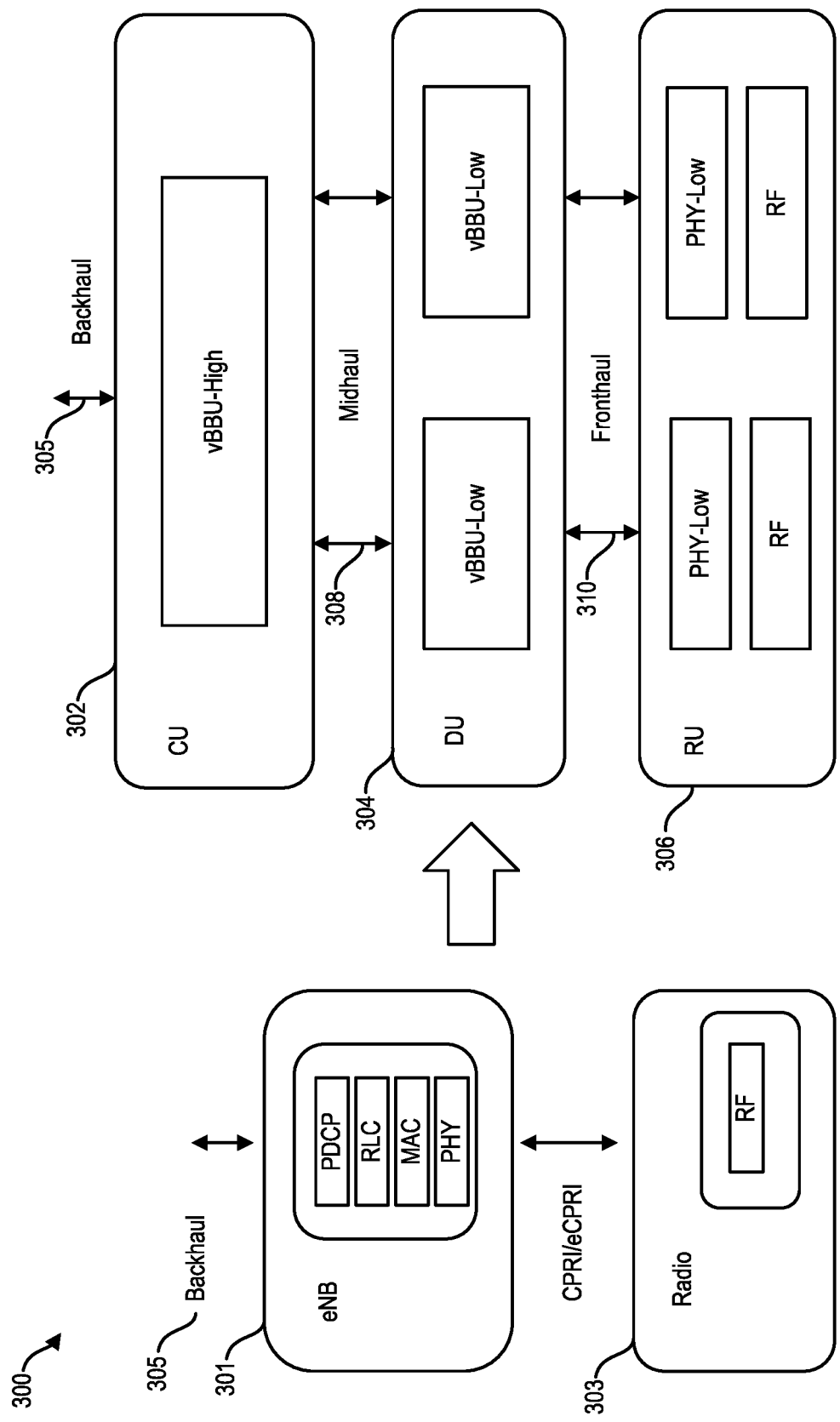
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
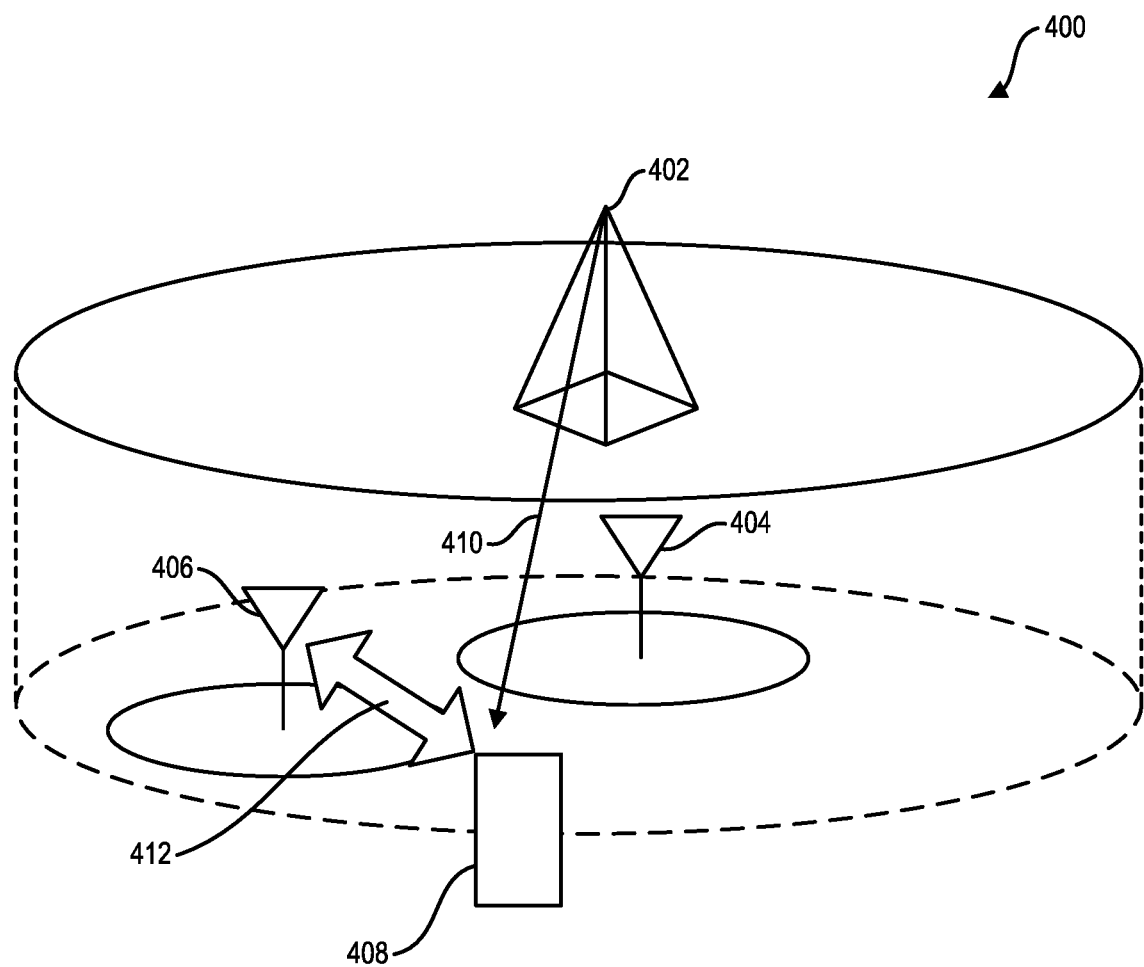
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
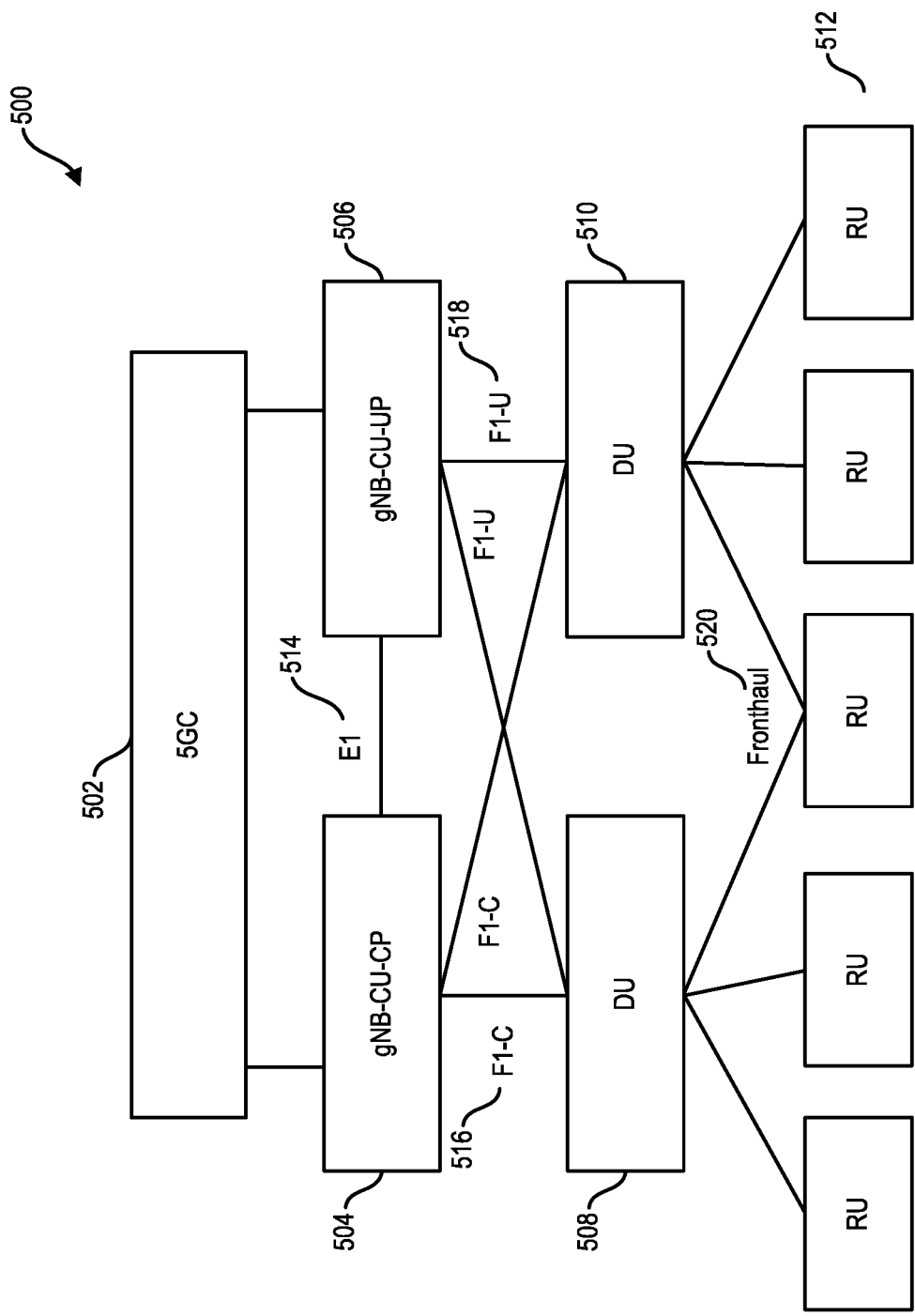
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
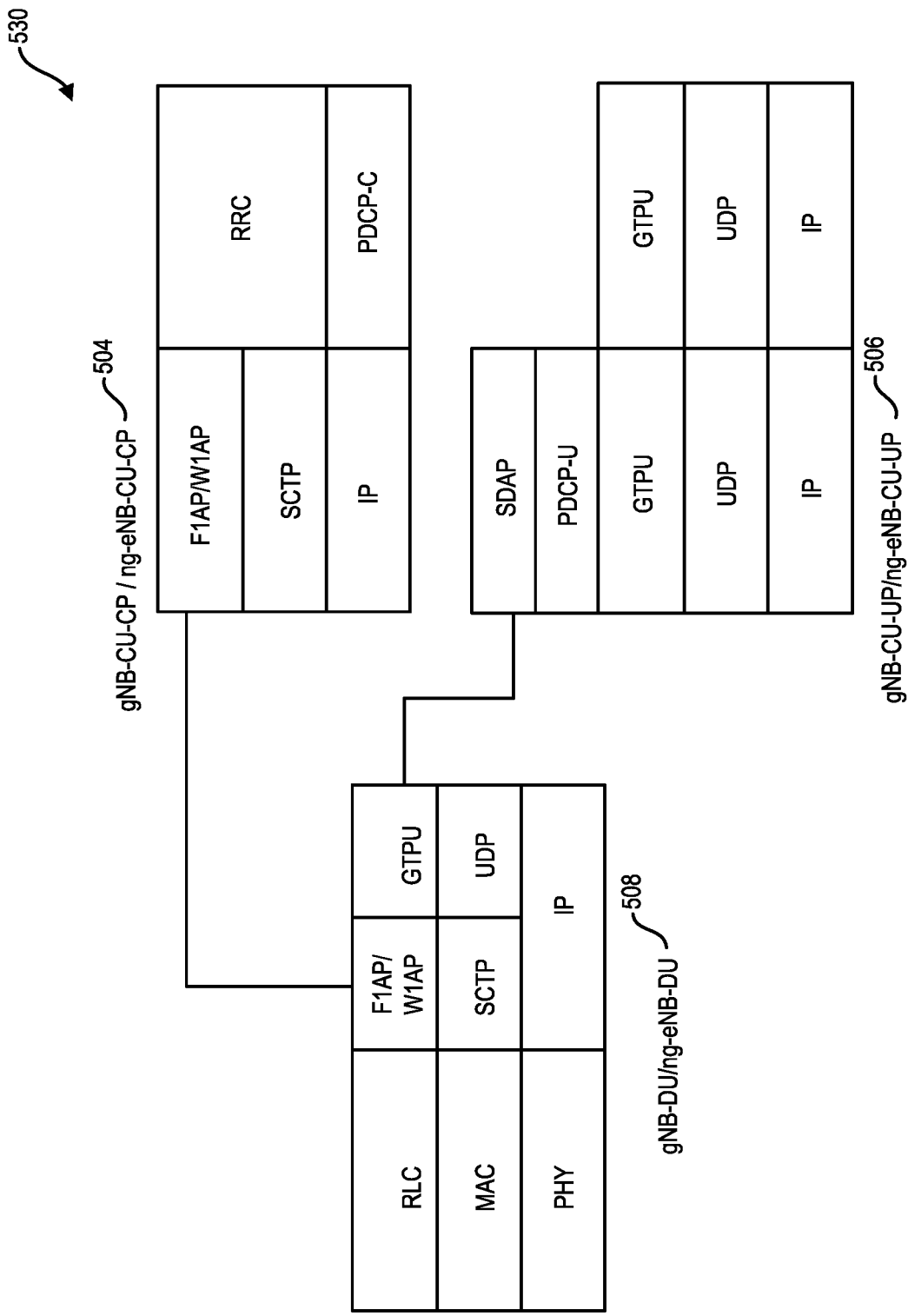
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
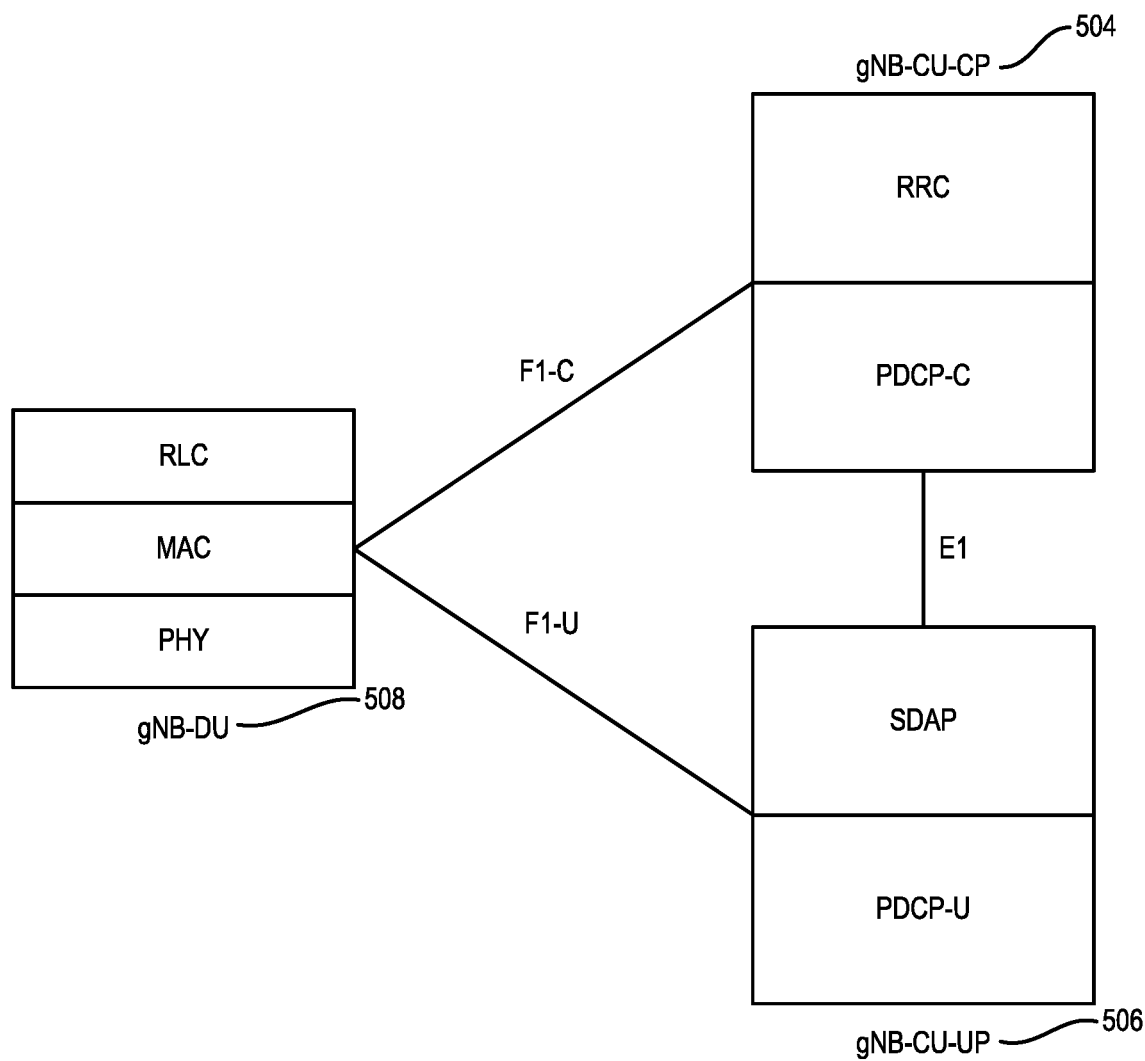
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Handling Core Network Connection Failure

In some implementations of the current subject matter, an F1 interface can be set up between a CU (e.g., gNB-CU of FIG. 5a, etc.) of a base station (e.g., gNodeB of FIG. 5a, etc.) of a 5G wireless communication system (e.g., system 500 of FIG. 5a, etc.) and a DU (e.g., DUs 508, 510 of FIGS. 5a-5c, etc.) of the base station even if the base station does not have connectivity to a core network (e.g., 5GC 502 of FIG. 5a, etc.) of the 5G wireless communication system. Currently, under 3GPP standards, a UE cannot be set up a connection with a 5G wireless communication system if the base station does not have connectivity to the core network. The DU therefore cannot provide service to UEs that are reliant on the base station being connected to the 5G core network for the UE to communicate over the wireless communication system. The DU is thus underutilized at least with respect to those UEs, e.g., to NSA UEs. However, setting up the F1 interface despite core network connection failure can allow the DU to be moved to an active state that allows the DU to provide service to those UEs, e.g., to NSA UEs.

In accordance with current 3GPP standards, setting up an F1 interface between a gNB-DU and a gNB-CU includes the DU transmitting an F1 SETUP REQUEST to the CU and the CU transmitting an F1 SETUP RESPONSE to the DU in reply. The CU thereafter transmits a GNB-DU CONFIGURATION UPDATE message to the DU that includes various configuration data. Thus, if the base station-5G core network connection is down, the CU transmits a GNB-CU CONFIGURATION UPDATE message to the DU with inclusion of barred list information or exclusion of available public land mobile network (PLMN) list information.

In some implementations of the current subject matter, a CU is configured to transmit a GNB-CU CONFIGURATION UPDATE message to the DU regardless of whether or not the base station has connectivity with the 5G core network. The F1 interface can therefore be set up even if the base station does not have currently have connectivity with the 5G core network, and the DU can be moved to an active state that allows the DU to provide service to a subset of UEs, e.g., NSA UEs, that are not reliant on the base station being connected to the 5G core network for the UEs to communicate over the wireless communication system.

As defined by 3GPP, the GNB-CU CONFIGURATION UPDATE message transmitted from the CU to the DU includes a Cells to be Activated List information element (IE) and a Cells to be Barred List IE. The Cells to be Activated List IE indicates to the DU which cells to activate (if not already activated) to allow for communication. The Cells to be Barred List IE indicates to the DU which cells to be barred from communication and whether to stop the cell from System Information Block Type 1 (SIB1) transmission or to allow the cell to do SIB1 transmission but without 5GS TAC. Alternatively or in addition, excluding the Available PLMN List IE from the message can be used to indicate to the DU whether to stop the cell from SIB1 transmission or to do SIB1 transmission without 5G System (5GS) Tracking Area Code (TAC).

In some implementations of the current subject matter, when the F1 interface is being set up with the base station having connectivity with the core network, the GNB-CU CONFIGURATION UPDATE message can be utilized as defined by 3GPP. When the F1 interface is being set up with connectivity down between the base station and core network, the Cells to be Activated List IE of the GNB-CU CONFIGURATION UPDATE message can indicate to the DU that the gNodeB can provide support to NSA UEs, and the Cells to be Barred List IE of the GNB-CU CONFIGURATION UPDATE message can indicate to the DU that the gNodeB cannot provide support to SA UEs. Existing elements defined by 3GPP, e.g., the GNB-CU CONFIGURATION UPDATE message, the Cells to be Activated List IE, and the Cells to be Barred List IE, can thus be utilized in setting up an F1 interface with 5G core network connectivity down and thus in allowing the base station to provide service to NSA UEs even when connectivity is down between the base station and 5G core network.

Figure 6:
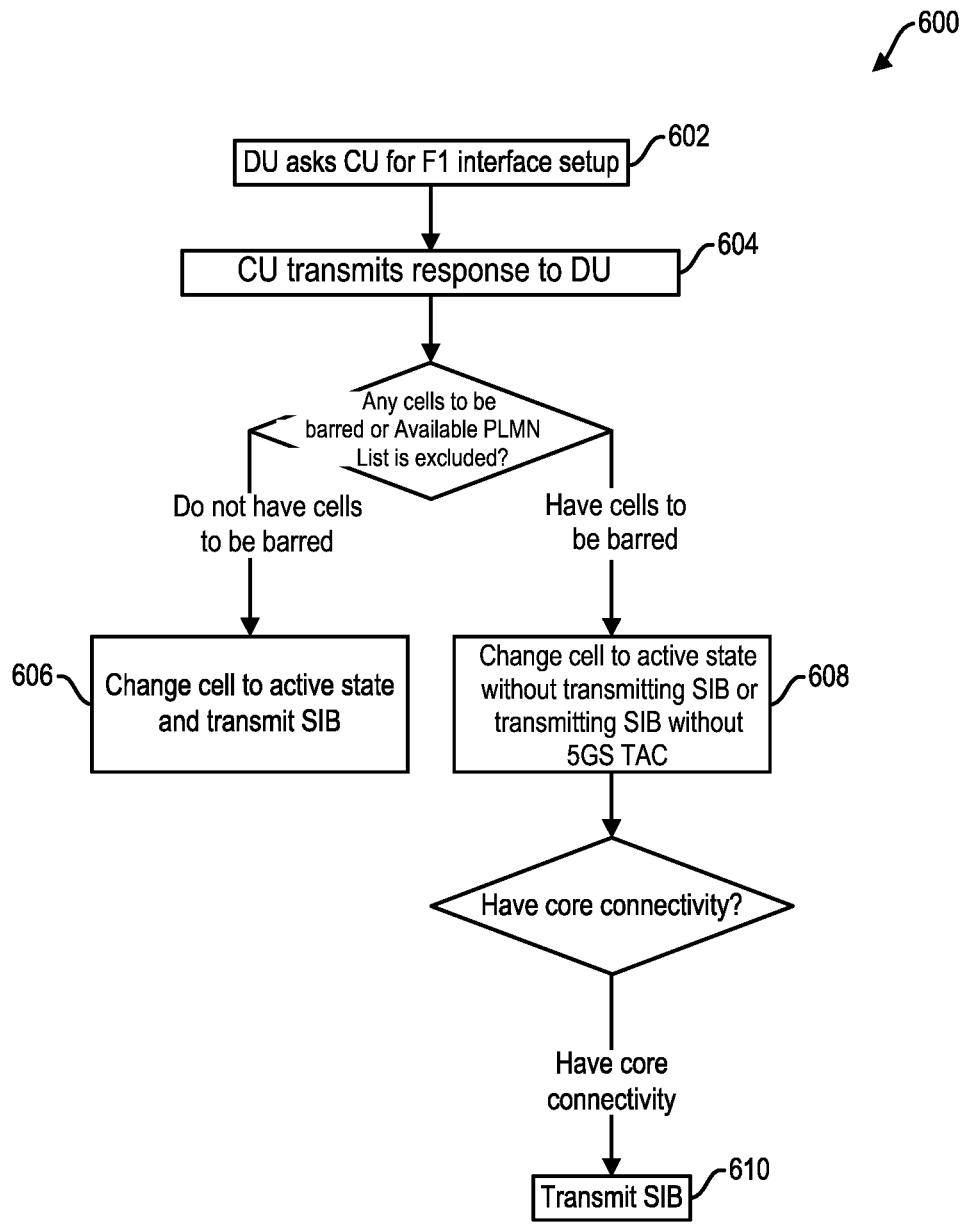
FIG. 6 illustrates an exemplary method of handling core network connectivity failure, according to some implementations of the current subject matter.

FIG. 6 illustrates an exemplary method 600 of handling core network connectivity failure, according to some implementations of the current subject matter. The method 600 includes a DU (e.g., DUs 508, 510 of FIGS. 5a-5c, etc.) of a base station (e.g., gNB of FIG. 5a), etc.) asking 602 a CU (e.g., gNB-CU of FIG. 5a, etc.) of the base station for F1 interface setup. The CU transmits 604 a response to the DU. The response transmitted 604 to the DU indicates to the DU whether or not to start transmitting System Information Block (SIB) information. SIB information, per 3GPP standards, transmitted by the base station, e.g., by the DU thereof, carries information (e.g., 5GS TAC) needed for SA UEs to access the cell.

In some implementations, the asking 602 can include the DU transmitting an F1 SETUP REQUEST to the CU, in accordance with 3GPP standards. In reply to the F1 SETUP REQUEST, the CU can transmit 604 an F1 SETUP RESPONSE to the DU, in accordance with 3GPP standards. Also in reply to the F1 SETUP REQUEST, the CU can transmit 604 a GNB-CU CONFIGURATION UPDATE to the DU, in accordance with 3GPP standards. The GNB-CU CONFIGURATION UPDATE message can include a Cells to be Activated List IE and a Cells to be Barred List IE, in accordance with 3GPP standards. The DU's receipt of the Cells to be Activated List IE and a Cells to be Barred List IE indicates to the DU that SIB information should not be transmitted or that SIB should be transmitted without 5GS TAC, e.g., because SA UEs should be barred from access. Alternatively or in addition, excluding an Available PLMN List IE from the GNB-CU CONFIGURATION UPDATE message can be used to indicate to the DU whether to stop the cell from SIB1 transmission or to allow the cell to do SIB1 transmission without 5GS TAC. Thus, as mentioned above, existing elements defined by 3GPP, e.g., the GNB-CU CONFIGURATION UPDATE message, the Cells to be Activated List IE, and the Cells to be Barred List IE and/or the Available PLMN List, can be utilized in setting up an F1 interface with core network connectivity down and thus in allowing the base station to provide service to NSA UEs even when connectivity is down between the base station and 5G core network.

In the method 600, if the base station does have core connectivity, as indicated to the DU by a Cells to be Activated List IE being transmitted from the CU to the DU and a Cells to be Barred List IE not being transmitted at all by the CU and thus not received at all by the DU (or, in some implementations, by the Cells to be Barred List IE being transmitted from the CU to the DU and being empty), the DU changes 606 cell state to active and transmits 606 SIB information. Alternatively or in addition, including the Available PLMN List IE in the message can be used to indicate to the DU whether to start doing SIB transmission with 5GS TAC. With the cell state active and SIB information transmitted, NSA UEs and SA UEs may access the base station, e.g., the DU thereof.

If the base station does not have core connectivity, as indicated to the DU by the Cells to be Barred List IE, the DU changes 608 cell state to active but does not transmit SIB information. NSA UEs may thus access the base station, e.g., the DU thereof, due to the active state, but SA UEs may not access the base station due to the lack of SIB information from the base station, e.g., from the DU thereof. If core connectivity is subsequently restored (or established as an initial connection), the DU transmits 610 SIB information with 5GS TAC, thereby now allowing SA UEs to access the base station, e.g., the UE thereof, in addition to the NSA UE access previously allowed.

In some implementations, in response to the restoration (or the establishment as an initial connection) of core connectivity, the CU transmits a second GNB-CU CONFIGURATION UPDATE to the DU, in accordance with 3GPP standards, similar to the previously transmitted GNB-CU CONFIGURATION UPDATE message discussed above. The DU can thus be informed that core connectivity exists and that SIB information with 5GS TAC may therefore be transmitted 610 to allow SA UE access in addition to the NSA UE access previously allowed.

Figure 7A:
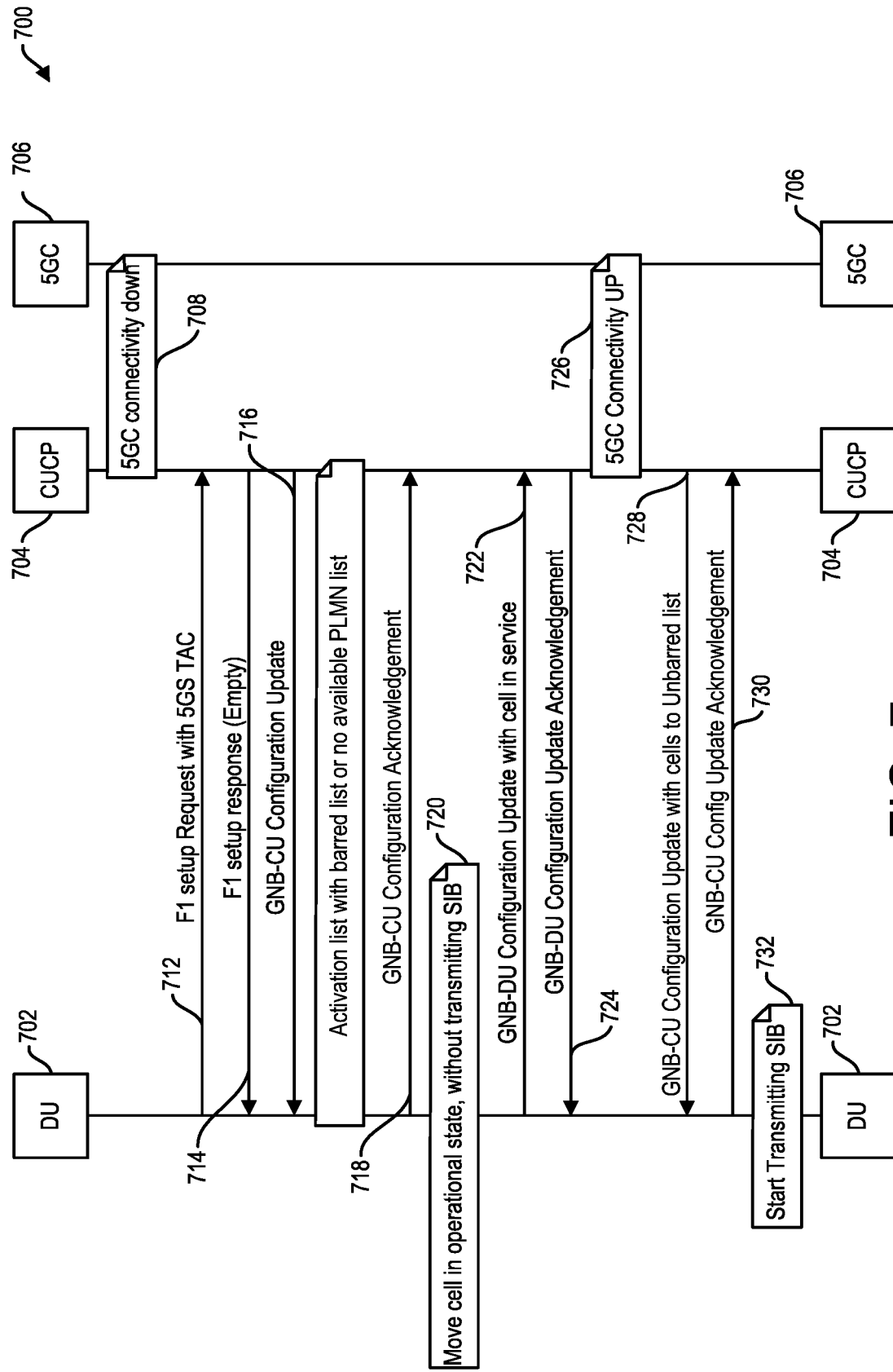
FIG. 7a illustrates an exemplary system configured to handle core network connectivity failure and an exemplary process in which F1 setup begins with 5G core network connectivity down, according to some implementations of the current subject matter.
Figure 7B:
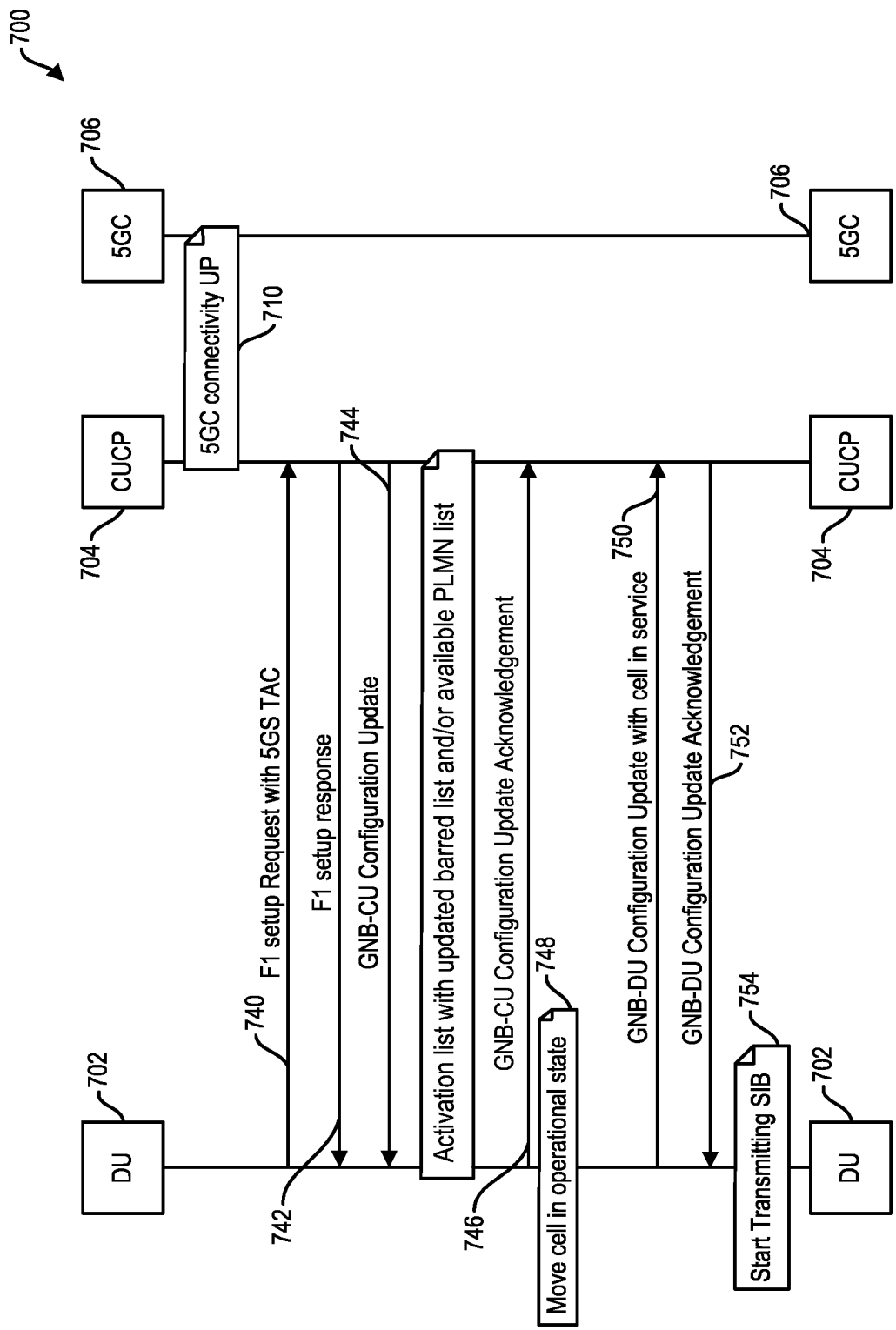
FIG. 7b illustrates the system of FIG. 7a and an exemplary process in which F1 setup begins with 5G core network connectivity up, according to some implementations of the current subject matter.

FIGS. 7a and 7b illustrate an exemplary implementation of the method 600 of FIG. 6 with respect to an exemplary system 700 configured to handle core network connectivity failure, according to some implementations of the current subject matter. The system 700 of FIGS. 7a and 7b is a 5G system. Thus, the system 700 includes a gNB-DU 702 (labeled "DU" in FIGS. 7a and 7b), e.g., DUs 508, 510 of FIGS. 5a-5c, etc.; a gNB-CU (e.g., gNB-CU of FIG. 5a, etc.); and a 5GC 706, e.g., 5GC 502 of FIG. 5a, etc. FIGS. 7a and 7b show a control plane portion gNB-CU-CP 704 (labeled "CUCP" in FIGS. 7a and 7b) of the gNB-CU, since the control plane portion gNB-CU-CP 704 can be configured to detect core network connectivity status (e.g., up or down) and can transmit and receive various message in F1 setup in accordance with 3GPP standards.

In general, FIG. 7a illustrates an implementation in which F1 setup begins with 5GC connectivity down 708, e.g., with the gNB not having connectivity with the 5GC 706, and FIG. 7b illustrates an implementation in which F1 setup begins with 5GC connectivity up 710, e.g., with the gNB having connectivity with the 5GC 706.

As shown in FIG. 7a, an F1 setup procedure can begin with 5GC connectivity down 708 between the gNB, e.g., the CUCP 704 thereof, and the 5GC 706. The CUCP 704 is aware of 5G connectivity status, in accordance with 3GPP standards, and thus knows that the 5GC connectivity is down 708.

With the 5GC connectivity down 708, the DU 702 transmits 712 an F1 SETUP REQUEST to the CUCP 704, in accordance with 3GPP standards. As shown in FIG. 7a, the F1 SETUP REQUEST can include a 5G System (5GS) Tracking Area Code (TAC) IE.

In response to receipt of the F1 SETUP REQUEST, the CUCP 704 transmits 714 an F1 SETUP RESPONSE to the DU 702, in accordance with 3GPP standards. In accordance with 3GPP standards, the F1 SETUP RESPONSE can optionally include a list of cells to be activated. As shown in FIG. 7a, the transmitted 714 F1 SETUP RESPONSE is empty and thus does not include a list of cells to be activated.

Thereafter, the CUCP 704 transmits 716 a GNB-CU CONFIGURATION UPDATE message to the DU 702. In response to receipt of the GNB-CU CONFIGURATION UPDATE message, the DU 702 transmits 718 a GNB-CU CONFIGURATION UPDATE ACKNOWLEDGE message to the CU 704, in accordance with 3GPP standards.

The GNB-CU CONFIGURATION UPDATE message is transmitted 716 to the DU 702 in accordance with 3GPP standards and can thus include a Cells to be Activated List IE and a Cells to be Barred List IE, as shown in FIG. 7a.

The Cells to be Activated List IE indicates, in accordance with 3GPP standards, which cells to activate (if not already activated) to allow for communication. Receipt of the Cells to be Activated List IE that is not empty indicates to the DU 702 that the DU 702 can move 720 the cell to an operational state, e.g., the cell state can be set to active. With the DU 702 in the active state, the DU 702 can be communicatively coupled with one or more NSA UEs and provide service thereto, even with core connectivity being down 708.

Receipt of the Cells to be Barred List IE by the DU 702 indicates to the DU 702 that System Information Block Type 1 (SIB1) should not be scheduled or the SIB1 should be scheduled without 5GS TAC. SIB1, per 3GPP standards, transmitted by the gNB carries information needed for SA UEs to access the cell. Thus, not scheduling SIB1 or scheduling SIB1 without 5GS TAC can prevent SA UEs from accessing the cell and thus prevent the DU 702 from providing service to any SA UEs (at this time since, as discussed herein, the DU 702 may later provide service to SA UEs should 5G core network connectivity become up).

After moving 720 the cell state to active, the DU 702 transmits 722 a GNB-DU CONFIGURATION UPDATE message to the CUCP 704, in accordance with 3GPP standards. As shown in FIG. 7a, the GNB-DU CONFIGURATION UPDATE message reports service status to the CUCP 704 indicative of the cell being in service.

In response to receipt of the GNB-DU CONFIGURATION UPDATE message, the CUCP 704 transmits 724 a GNB-DU CONFIGURATION UPDATE ACKNOWLEDGEMENT message to the DU 702, in accordance with 3GPP standards.

5GC connectivity may remain down 708 for any amount of time after the CUCP 704 transmits 724 the GNB-DU CONFIGURATION UPDATE ACKNOWLEDGEMENT message. During this time, the DU 702 can provide service to one or more NSA UEs but cannot provide service to any SA.

At some point after the CUCP 704 transmits 724 the GNB-DU CONFIGURATION UPDATE ACKNOWLEDGEMENT message, 5GC connectivity may become up 726 between the gNB, e.g., the CUCP 704 thereof, and the 5GC 706. The CUCP 704 is aware of 5G connectivity status, in accordance with 3GPP standards, and thus knows that the 5GC connectivity is now up 726.

In response to the 5GC connectivity being up 726 after previously being down 708, the CUCP 704 transmits 728 a second GNB-CU CONFIGURATION UPDATE message to the DU 702, in accordance with 3GPP standards. In response to receipt of the second GNB-CU CONFIGURATION UPDATE message, the DU 702 transmits 730 a second GNB-CU CONFIGURATION UPDATE ACKNOWLEDGE message to the CU 704, in accordance with 3GPP standards.

The Cells to be Activated List IE (and, in some implementations, an empty Cells to be Barred List IE) included in the second GNB-CU CONFIGURATION UPDATE message reflect the gNB-5GC connectivity being up 726 by including cells in the Cells to be Activated List IE that were in the Cells to be Barred List IE transmitted 716 in the prior GNB-CU CONFIGURATION UPDATE message. Thus, the DU's receipt of the Receipt of the Cells to be Activated List IE in the second GNB-CU CONFIGURATION UPDATE ACKNOWLEDGE message indicates to the DU 702 that the DU 702 can start 732 SIB1 scheduling with 5GS TAC, thereby allowing SA UEs to access the cell. Alternatively or in addition, including the Available PLMN List IE can be used to indicate to the DU to start 732 SIB1 transmission with 5GS TAC. The DU 702 can thus provide service to both NSA UEs and SA UEs with 5GC connectivity being up 726.

As shown in FIG. 7b, an F1 setup procedure can begin with 5GC connectivity up 710 between the gNB, e.g., the CUCP 704 thereof, and the 5GC 706. The CUCP 704 is aware of 5G connectivity status, in accordance with 3GPP standards, and thus knows that the 5GC connectivity is up 710.

The F1 setup procedure of FIG. 7b is performed in accordance with 3GPP standards and includes the DU 702 transmitting 740 an F1 SETUP REQUEST to the CUCP 704, and the CUCP 704 thereafter transmitting 742 an F1 SETUP RESPONSE to the DU 702 and transmitting 744 a GNB-CU CONFIGURATION UPDATE message to the DU 702. In response to receipt of the GNB-CU CONFIGURATION UPDATE message, the DU 702 transmits 746 a GNB-CU CONFIGURATION UPDATE ACKNOWLEDGE message to the CU 704, in accordance with 3GPP standards.

The GNB-CU CONFIGURATION UPDATE message is transmitted 744 to the DU 702 in accordance with 3GPP standards and can thus include a Cells to be Activated List IE and a Cells to be Barred List IE, as shown in FIG. 7b. In some implementations, the Cells to be Barred List IE is omitted from the GNB-CU CONFIGURATION UPDATE message since there may now be no cells to be barred. Because 5GC connectivity is up 710, SA UEs do not need to be barred, unlike in the F1 setup procedure of FIG. 7a. Receipt of the Cells to be Activated List IE that is not empty indicates to the DU 702 that the DU 702 can move 748 the cell to an operational state, e.g., the cell state can be set to active. After moving 748 the cell state to active, the DU 702 transmits 750 a GNB-DU CONFIGURATION UPDATE message to the CUCP 704. In response to receipt of the GNB-CU CONFIGURATION UPDATE message, the DU 702 transmits 752 a GNB-CU CONFIGURATION UPDATE ACKNOWLEDGE message to the CU 704 and can start 754 SIB1 scheduling, thereby allowing SA UEs to access the cell. The DU 702 can thus provide service to both NSA UEs and SA UEs with 5GC connectivity being up 710.

Although FIGS. 7a and 7b are described with respect to a 5G wireless communication system, handling core network connectivity failure as described herein can be performed similarly with respect to other types of wireless communication systems, such as wireless communication systems of a later generation than 5G.

Figure 8:
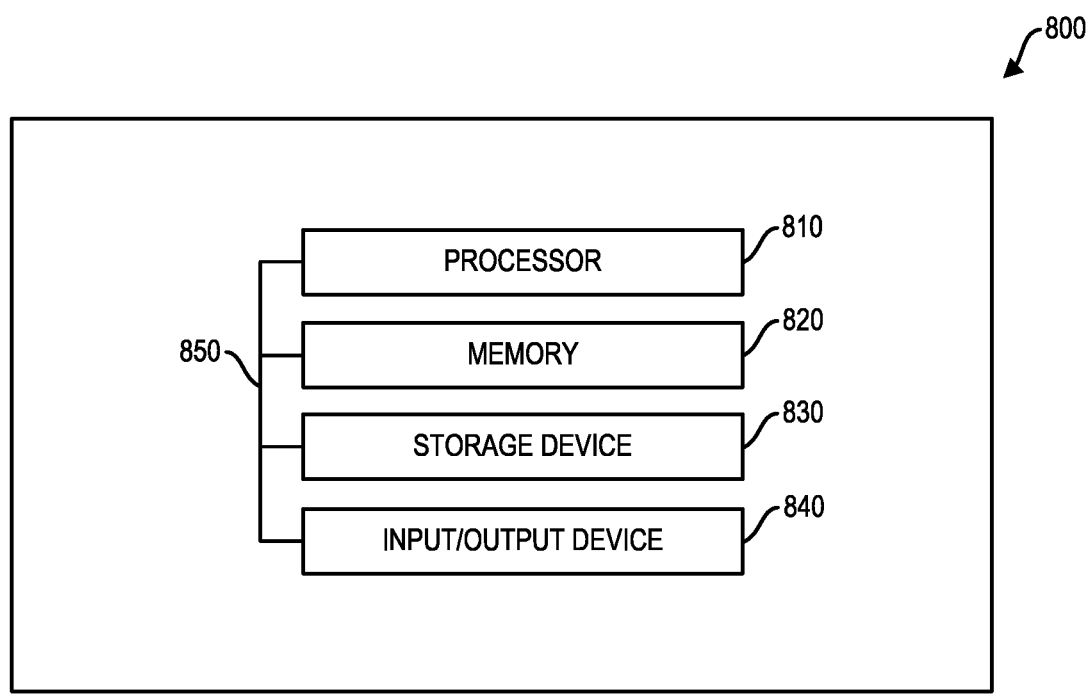
FIG. 8 illustrates an exemplary system, according to some implementations of the current subject matter.
Figure 9:
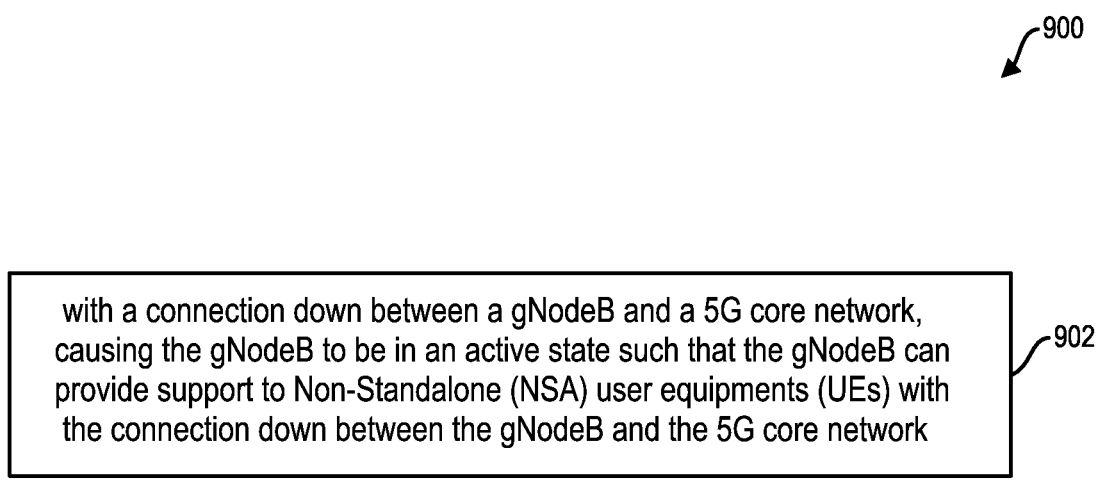
FIG. 9 illustrates an exemplary method, according to some implementations of the current subject matter.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 600. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

FIG. 8 illustrates an exemplary method 900 for handling core network connection failure, according to some implementations of the current subject matter. The method 900 may be performed, for example, using implementations shown in and described with respect to FIGS. 7a and 7b.

The method 900 can include, with a connection down between a gNodeB (e.g., gNodeB of FIG. 5a, gNodeB of FIGS. 7a and 7b, etc.) and a 5G core network (e.g., 5GC 502 of FIG. 5a, 5GC 706 of FIGS. 7a and 7b, etc.), causing 902 the gNodeB to be in an active state such that the gNodeB can provide support to NSA UEs with the connection down between the gNodeB and the 5G core network.

In some implementations, the current subject matter can include one or more of the following optional features.

In some implementations, causing the gNodeB to be in the active state can include the active state being set in a DU (e.g., DUs 508, 510 of FIGS. 5a-5c, DU 602 of FIGS. 6a and 6b, etc.) of the gNodeB in response to information received by the DU from a CU (e.g., gNB-CU of FIG. 5a, gNB-CU of FIGS. 6a and 6b, etc.) of the gNodeB.

In some implementations, causing the gNodeB to be in the active state can include causing an F1 interface to be set up between a CU (e.g., gNB-CU of FIG. 5a, gNB-CU of FIGS. 6a and 6b, etc.) of the gNodeB and a DU (e.g., DUs 508, 510 of FIGS. 5a-5c, DU 602 of FIGS. 6a and 6b, etc.) of the gNodeB. Further, the F1 interface can be set up between the CU of the gNodeB and the DU of the gNodeB without performing SIB1 scheduling or the F1 interface can be set up between the CU of the gNodeB and the DU of the gNodeB performing SIB1 without 5G System (5GS) Tracking Area Code (TAC).

In some implementations, causing the gNodeB to be in the active state can include transmitting a GNB-CU CONFIGURATION UPDATE message from a CU (e.g., gNB-CU of FIG. 5a, gNB-CU of FIGS. 6a and 6b, etc.) of the gNodeB to a DU (e.g., DUs 508, 510 of FIGS. 5a-5c, DU 602 of FIGS. 6a and 6b, etc.) of the gNodeB. Further, a Cells to be Activated List included in the GNB-CU CONFIGURATION UPDATE message can indicate to the DU that the gNodeB can provide support to NSA UEs, and either inclusion of a Cells to be Barred List in or exclusion of an Available PLMN List from the GNB-CU CONFIGURATION UPDATE message can indicate to the DU that the gNodeB cannot provide support to Standalone (SA) UEs.

In some implementations, the operations can further include, after causing the gNodeB to be in the active state with the connection down between the gNodeB and the 5G core network, causing, in response to the connection between the gNodeB and the 5G core network becoming available, the gNodeB to be able to provide support to SA UEs. Further, causing the gNodeB to be in the active state such that the gNodeB can provide support to NSA UEs can include transmitting a first GNB-CU CONFIGURATION UPDATE message from a CU (e.g., gNB-CU of FIG. 5a, gNB-CU of FIGS. 6a and 6b, etc.) of the gNodeB to a DU (e.g., DUs 508, 510 of FIGS. 5a-5c, DU 602 of FIGS. 6a and 6b, etc.) of the gNodeB, and causing the gNodeB to be able to provide support to SA UEs can include transmitting a second GNB-CU CONFIGURATION UPDATE message from the CU of the gNodeB to the DU of the gNodeB; and/or the gNodeB can be caused to be in the active state with the connection down between the gNodeB and the 5G core network without performing SIB1 scheduling or the gNodeB can be caused to be in the active state with the connection down between the gNodeB and the 5G core network performing SIB1 scheduling without the 5GS TAC, and causing the gNodeB to be in the active state such that the gNodeB is able to provide support to SA UEs can include performing SIB1 scheduling. Further, a first Cells to be Activated List included in the first GNB-CU CONFIGURATION UPDATE message can indicate to the DU that the gNodeB can provide support to NSA UEs, a first Cells to be Barred List included in or an Available PLMN List excluded from the first GNB-CU CONFIGURATION UPDATE message can indicate to the DU that the gNodeB cannot provide support to SA UEs, and a second Cells to be Activated List included in and/or the Available PLMN List included in the second GNB-CU CONFIGURATION UPDATE message can indicate to the DU that the gNodeB can provide support to the SA UEs.

In some implementations, the gNodeB can include the at least one processor and the at least one non-transitory storage media.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
   at least one processor, and
   at least one non-transitory storage media storing instructions that, when executed by the at least one processor, cause the at least one processor to perform operations comprising:
      with a connection down between a gNodeB and a 5G core network, causing the gNodeB to be in an active state such that the gNodeB provides support to Non-Standalone (NSA) user equipments (UEs) with the connection down between the gNodeB and the 5G core network.

2. The apparatus of claim 1, wherein causing the gNodeB to be in the active state comprises the active state being set in a distributed unit (DU) of the gNodeB in response to information received by the DU from a centralized unit (CU) of the gNodeB.

3. The apparatus of claim 1, wherein causing the gNodeB to be in the active state comprises causing an F1 interface to be set up between a centralized unit (CU) of the gNodeB and a distributed unit (DU) of the gNodeB.

4. The apparatus of claim 3, wherein the F1 interface is set up between the CU of the gNodeB and the DU of the gNodeB without performing System Information Block Type 1 (SIB1) scheduling or the F1 interface is set up between the CU of the gNodeB and the DU of the gNodeB performing SIB1 without 5G System (5GS) Tracking Area Code (TAC).

5. The apparatus of claim 1, wherein causing the gNodeB to be in the active state comprises transmitting a GNB-CU CONFIGURATION UPDATE message from a centralized unit (CU) of the gNodeB to a distributed unit (DU) of the gNodeB.

6. The apparatus of claim 5, wherein a Cells to be Activated List included in the GNB-CU CONFIGURATION UPDATE message indicates to the DU that the gNodeB can provide support to NSA UEs; and
   either inclusion of a Cells to be Barred List in or exclusion of an Available PLMN List excluded from the GNB-CU CONFIGURATION UPDATE message indicates to the DU that the gNodeB cannot provide support to Standalone (SA) UEs.

7. The apparatus of claim 1, wherein the operations further comprise:
   after causing the gNodeB to be in the active state with the connection down between the gNodeB and the 5G core network, causing, in response to the connection between the gNodeB and the 5G core network becoming available, the gNodeB to be able to provide support to Standalone (SA) UEs.

8. The apparatus of claim 7, wherein causing the gNodeB to be in the active state such that the gNodeB provides support to NSA UEs comprises transmitting a first GNB-CU CONFIGURATION UPDATE message from a centralized unit (CU) of the gNodeB to a distributed unit (DU) of the gNodeB; and
   causing the gNodeB to provide support to SA UEs comprises transmitting a second GNB-CU CONFIGURATION UPDATE message from the CU of the gNodeB to the DU of the gNodeB.

9. The apparatus of claim 8, wherein a first Cells to be Activated List included in the first GNB-CU CONFIGURATION UPDATE message indicates to the DU that the gNodeB can provide support to NSA UEs;
   a first Cells to be Barred List included in or an Available PLMN List excluded from the first GNB-CU CONFIGURATION UPDATE message indicates to the DU that the gNodeB cannot provide support to SA UEs; and
   a second Cells to be Activated List and/or the Available PLMN List included in the second GNB-CU CONFIGURATION UPDATE message indicates to the DU that the gNodeB can provide support to the SA UEs.

10. The apparatus of claim 7, wherein the gNodeB is caused to be in the active state with the connection down between the gNodeB and the 5G core network without performing System Information Block Type 1 (SIB1) scheduling or the gNodeB is caused to be in the active state with the connection down between the gNodeB and the 5G core network performing SIB1 scheduling without 5GS TAC; and
   causing the gNodeB to be in the active state such that the gNodeB provides support to SA UEs comprises performing SIB1 scheduling.

11. The apparatus of claim 1, wherein the gNodeB includes the at least one processor and the at least one non-transitory storage media.

12. The apparatus of claim 1, wherein the connection that is down is a connection between a centralized unit (CU) of the gNodeB and the 5G core network.

13. The apparatus of claim 1, wherein causing the gNodeB to be in the active state comprises transmitting a GNB-CU CONFIGURATION UPDATE message from a centralized unit (CU) of the gNodeB to a distributed unit (DU) of the gNodeB, and
   wherein GNB-CU CONFIGURATION UPDATE message indicates whether to provide support for at least one NSA UE or to not provide support for at least one NSA UE.

14. The apparatus of claim 1, wherein causing the gNodeB to be in the active state comprises transmitting a GNB-CU CONFIGURATION UPDATE message from a centralized unit (CU) of the gNodeB to a distributed unit (DU) of the gNodeB, and
   wherein a Cells to be Activated List included in the GNB-CU CONFIGURATION UPDATE message indicates to the DU that the gNodeB can provide support to NSA UEs.

15. The apparatus of claim 1, wherein causing the gNodeB to be in the active state comprises transmitting a GNB-CU CONFIGURATION UPDATE message from a centralized unit (CU) of the gNodeB to a distributed unit (DU) of the gNodeB, and inclusion of a Cells to be Barred List in the GNB-CU CONFIGURATION UPDATE message indicates to the DU that the gNodeB cannot provide support to Standalone (SA) UEs.

16. The apparatus of claim 1, wherein causing the gNodeB to be in the active state comprises transmitting a GNB-CU CONFIGURATION UPDATE message from a centralized unit (CU) of the gNodeB to a distributed unit (DU) of the gNodeB, and exclusion of an Available PLMN List excluded from the GNB-CU CONFIGURATION UPDATE message indicates to the DU that the gNodeB cannot provide support to Standalone (SA) UEs.

17. A computer-implemented method, comprising:
with a connection down between a gNodeB and a 5G core network, causing the gNodeB to be in an active state such that the gNodeB provides support to Non-Standalone (NSA) user equipments (UEs) with the connection down between the gNodeB and the 5G core network.

18. The method of claim 17, wherein causing the gNodeB to be in the active state comprises the active state being set in a distributed unit (DU) of the gNodeB in response to information received by the DU from a centralized unit (CU) of the gNodeB.

19. The method of claim 17, wherein causing the gNodeB to be in the active state comprises causing an F1 interface to be set up between a centralized unit (CU) of the gNodeB and a distributed unit (DU) of the gNodeB.

20. The method of claim 17, wherein causing the gNodeB to be in the active state comprises transmitting a GNB-CU CONFIGURATION UPDATE message from a centralized unit (CU) of the gNodeB to a distributed unit (DU) of the gNodeB.

21. At least one non-transitory storage media storing instructions that, when executed by at least one processor, cause the at least one processor to perform operations comprising:
with a connection down between a gNodeB and a 5G core network, causing the gNodeB to be in an active state such that the gNodeB provides support to Non-Standalone (NSA) user equipments (UEs) with the connection down between the gNodeB and the 5G core network.

22. The storage media of claim 21, wherein causing the gNodeB to be in the active state comprises the active state being set in a distributed unit (DU) of the gNodeB in response to information received by the DU from a centralized unit (CU) of the gNodeB.

23. The storage media of claim 21, wherein causing the gNodeB to be in the active state comprises causing an F1 interface to be set up between a centralized unit (CU) of the gNodeB and a distributed unit (DU) of the gNodeB.

24. The storage media of claim 21, wherein causing the gNodeB to be in the active state comprises transmitting a GNB-CU CONFIGURATION UPDATE message from a centralized unit (CU) of the gNodeB to a distributed unit (DU) of the gNodeB.

* * * * *